US009299126B2

(12) United States Patent
Fries et al.

(10) Patent No.: US 9,299,126 B2
(45) Date of Patent: Mar. 29, 2016

(54) IMAGE PROCESSING APPARATUS AND A METHOD OF STORING ENCODED DATA BLOCKS GENERATED BY SUCH AN IMAGE PROCESSING APPARATUS

(71) Applicant: ARM LIMITED, Cambridge (GB)

(72) Inventors: Jakob Axel Fries, Malmo (SE); Lars Oskar Flordal, Lund (SE)

(73) Assignee: ARM Limited, Cambridge (GB)

( * ) Notice: Subject to any disclaimer, the term of this patent is extended or adjusted under 35 U.S.C. 154(b) by 378 days.

(21) Appl. No.: 14/024,923

(22) Filed: Sep. 12, 2013

(65) Prior Publication Data

US 2015/0070372 A1    Mar. 12, 2015

(51) Int. Cl.
*G06K 9/36* (2006.01)
*G06T 1/60* (2006.01)
*G06F 12/02* (2006.01)
*G06F 11/10* (2006.01)

(52) U.S. Cl.
CPC .............. *G06T 1/60* (2013.01); *G06F 12/0246* (2013.01); *G06F 11/1064* (2013.01)

(58) Field of Classification Search
CPC ............ G06F 12/0246; G06F 11/1064; G06F 12/1009; G06F 3/0679; G06F 12/0866; G06F 2212/7203; G06T 1/60
See application file for complete search history.

(56) References Cited

U.S. PATENT DOCUMENTS

| | | | | |
|---|---|---|---|---|
| 6,275,535 B1 * | 8/2001 | Bramley | ................ | H04N 19/61 375/240.25 |
| 6,327,305 B1 * | 12/2001 | Porter | ....................... | G06T 9/00 375/240.13 |
| 2005/0180643 A1 * | 8/2005 | Okada | .................. | H04N 19/127 382/232 |
| 2005/0289295 A1 * | 12/2005 | Shoham | ................. | G11C 15/00 711/108 |
| 2007/0204128 A1 * | 8/2007 | Lee | ..................... | G06F 12/0246 711/173 |
| 2014/0025865 A1 * | 1/2014 | Marukame | ........... | G06F 3/0679 711/103 |
| 2014/0108884 A1 * | 4/2014 | Shu | .................... | G06F 11/1064 714/758 |

* cited by examiner

*Primary Examiner* — Stephen R Koziol
*Assistant Examiner* — Jonathan S Lee
(74) *Attorney, Agent, or Firm* — Nixon & Vanderhye P.C.

(57) ABSTRACT

An image processing apparatus and method including an encoder circuitry for generating encoded data blocks from input data blocks of an image, and write circuitry for storing the encoded data blocks to memory for subsequent access by decoding circuitry. For each input data block, identifier generation circuitry generates an identifier value that is dependent on the input data block. A lookup storage stores predetermined information relating to at least one encoded data block and stored within the lookup storage in association with the identifier value for the corresponding input data block. For a current input data block, a check is performed to determine whether a match exists between the identifier value generated for the current input data block and an identifier value stored in the lookup storage. In a match, the predetermined information is used by the write circuitry when performing the required write operation.

21 Claims, 11 Drawing Sheets

IMAGE PROCESSING APPARATUS AND A METHOD OF STORING ENCODED DATA BLOCKS GENERATED BY SUCH AN IMAGE PROCESSING APPARATUS

BACKGROUND OF THE INVENTION

1. Field of the Invention

The present invention relates to an image processing apparatus and to a method of storing encoded data blocks generated by such an image processing apparatus.

2. Description of the Prior Art

In an image processing apparatus, for example a graphics processing unit (GPU) used to process graphics images, there is often a requirement to encode the various frames of image data in order to reduce the memory requirements of the system. Typically an image frame will be considered as a plurality of data blocks which collectively form the image frame, and each data block will be encoded separately. The image processing apparatus will hence include encoder circuitry for performing encoding operations on input data blocks in order to generate encoded data blocks, and those encoded data blocks will then be stored to memory within the system, from where they can then be retrieved by other components within the graphics system, for example a display controller which will then decode the various encoded data blocks in order to generate image frames for display.

Whilst the encoding of image data can significantly reduce the memory requirements of the system, the memory requirements are still a significant issue in many modern image processing systems, and are becoming more and more significant as the resolution of the images increases, and hence the volume of data being processed increases.

The volume of encoded data that needs to be stored to memory not only affects the memory requirements of the system, but also gives rise to bandwidth issues within the system as that encoded data is passed between the encoder circuitry and memory, and then subsequently passed from the memory to a further component of the system for decoding.

It would be desirable to develop a technique which alleviated such memory and bandwidth requirements within an image processing system.

SUMMARY OF THE INVENTION

Viewed from a first aspect, the present invention provides an image processing apparatus, comprising: encoder circuitry configured to perform an encoding operation on input data blocks in order to generate encoded data blocks, an image being formed by a plurality of said input data blocks, and each of said input data blocks comprising a plurality of data values; write circuitry configured to perform a write operation in order to store the encoded data blocks to a memory for subsequent access by decoding circuitry; identifier generation circuitry configured, for each input data block, to generate an identifier value that is dependent on the plurality of data values of the input data block; a lookup storage configured to store predetermined information relating to at least one encoded data block, said predetermined information being stored within the lookup storage in association with the identifier value for the corresponding input data block; and lookup circuitry configured, for a current input data block, to determine whether a match exists between the identifier value generated for said current input data block and an identifier value stored in the lookup storage; the write circuitry being configured, in the presence of said match, to use the predetermined information stored in the lookup storage in association with the matching identifier value, when performing the write operation associated with the current input data block.

In accordance with the present invention, for each input data block an identifier value is generated that is dependent on the data values constituting that input data block. For a number of encoded data blocks, predetermined information is stored within a lookup storage in association with the identifier value for the corresponding input data block. For each newly received input data block, the associated identifier value is then used to perform a lookup within the lookup storage in order to determine whether that identifier value is already stored within the lookup storage. If so, the predetermined information stored in the lookup storage in association with that matching identifier value is then used by the write circuitry when performing a write operation in order to store the required information about the encoded data blocks to memory for subsequent access by decoding circuitry.

In one embodiment, this mechanism can be used to reduce the amount of information that collectively needs to be stored out to memory when encoding a series of input data blocks, thereby alleviating the memory requirements of the system, and also alleviating bandwidth constraints that might otherwise be placed on the infrastructure connecting the image processing apparatus with the memory, and on the infrastructure connecting the memory device within any other elements within the image processing system that consume that encoded data.

In one embodiment, the above described mechanism is used to identify situations where the input data blocks match previously received input data blocks, and uses that information to avoid the need to write certain encoded data blocks out to memory. Instead, in such situations a previously encoded data block that has been stored out to memory can be used as the encoded data block for the current input data block under consideration.

There are a number of ways in which the encoded data block(s) for which predetermined information is stored in the lookup storage can be selected. In one embodiment, those encoded data blocks may be predetermined, for example such that the lookup storage maintains predetermined information for a number of encoded data blocks that are expected to be needed often during processing of the input data blocks of input images. However, in one embodiment, the lookup storage is configured to store predetermined information relating to at least one encoded data block previously stored to the memory by the write circuitry. Hence, in such an embodiment, the content of the lookup storage is dependent on previous encoding/writing activity of the image processing apparatus.

The identifier generation circuitry can be configured to generate the identifier value in a variety of ways. In one embodiment, the identifier generation circuitry is configured, for each input data block, to receive one of the input data block and the corresponding encoded data block generated by the encoder circuitry, and to generate the identifier value from that received data.

The predetermined information that is stored in the lookup storage can take a variety of four's. However, in one embodiment the predetermined information comprises at least an address indication used to identify a location within the memory for storage of the corresponding encoded data block. The address indication can take a variety of forms, but in one embodiment takes the form of a pointer value used to identify a location within the memory.

With such a form of predetermined information, when a match is detected within the lookup storage, the address indication stored in association with the matching identifier value can be used to identify an encoded data block that has already been stored in memory, and which correctly represents encoded data for the currently considered input data block. Accordingly, whilst in the absence of such a match, the write circuitry can be configured to store to memory both the corresponding encoded data block for the current input data block and also control data that identifies the location within the memory where that encoded data block is stored, in the presence of a match the write circuitry can instead be arranged to only store to the memory the control data, and in particular the write circuitry in that instance will not store any encoded data block produced by the encoder circuitry for the currently considered input data block. Instead, the control data that is stored to memory in the event of a match uses the address indication obtained from the lookup storage, and accordingly identifies the location within the memory where the required encoded data block has already been stored via a previous write operation. This significantly reduces the memory and bandwidth requirements of the system.

The control data can take a variety of forms, but in one embodiment forms a header portion for the encoded data block corresponding to the current input data block, and the operation of the write circuitry in the presence of said match results in the memory storing multiple header portions associated with a single stored encoded data block. Hence, whilst a header portion will be written out to memory for each input data block, certain of the encoded data blocks can be re-used for multiple of the input data blocks, thus significantly reducing memory and bandwidth requirements.

Whilst in the above described embodiments the predetermined information stored in the lookup storage may include an address indication, the predetermined information can additionally include other information that relates to the corresponding encoded data block. For example, in embodiments using the above described header portion, the predetermined information can comprise the header portion for the corresponding encoded data block, with each header portion including the address indication. In one embodiment, in situations where there are two identical input data blocks, the required header portion associated with each input data block will be the same, and accordingly the header portion as retrieved from the lookup storage can be used to form the header portion written out to memory in respect of the currently considered input data block.

The identifier generation circuitry can take a variety of forms, but it is desirable for the identifier generation circuitry to be able to generate an identifier value that is expected to be effectively unique for a particular set of data values forming an input data block. However, it also desirable for the identifier value to occupy a smaller number of bits than the plurality of data values making up each individual input data block, in order to reduce the storage requirements of the lookup storage. In one embodiment this is achieved by arranging the identifier generation circuitry to perform a cyclic redundancy check operation in order to generate as the identifier value a check code value. As the check code value is represented with fewer bits than the input data block, the check code value cannot be guaranteed to be unique for every possible variation of values of the input data block. However, in one embodiment, the check code is large enough to ensure with a high degree of confidence that the generated check code values will be unique for the values of input data blocks expected to be used in most scenarios.

Whilst in one embodiment the encoder circuitry can be configured to perform the encoding operation on every input data block received, for example by that encoding operation being performed in parallel with the generation of the identifier value by the identifier generation circuitry, in an alternative embodiment the operation of the encoder circuitry can be deferred until the outcome of the lookup operation within the lookup storage is known. In that way, in the event of a match being detected, the encoder circuitry can be configured not to perform the encoding operation. Such an approach can reduce the power consumption of the image processing apparatus, but will have some impact on performance due to the delay in initiating the encoding operation in situations where a match does not exist and hence the encoding operation is required to be performed.

As mentioned previously, the predetermined information that is stored in the lookup storage can take a variety of forms. In an alternative embodiment to that described earlier, the predetermined information may comprise the corresponding encoded data block. Hence, in the event of a match being detected in the lookup storage, the encoded data block can be retrieved from the lookup storage and used by the write circuitry when performing the write operation. In contrast, when there is not a match, the write circuitry will use the corresponding encoded data block as generated by the encoder circuitry. Such an approach can be useful in embodiments where the encoding operation is very demanding in terms of power consumption and/or time, with such an approach potentially reducing power consumption and latency when encoding several identical blocks.

In one such embodiment, the operation of the encoder circuitry is delayed until the outcome of the lookup procedure is known, and in the presence of a match being detected the encoder circuitry is configured not to perform the encoding operation, thereby enabling a reduction in power consumption. However, even in situations where the encoder circuitry is configured to initiate the encoding operation without awaiting the outcome of the lookup process, such an approach can reduce latency, since the required encoded data block may be obtained more quickly via the lookup storage in the event of a match being detected than would be the case when waiting for the encoded data block to be generated by the encoder circuitry, in situations where the encoding operation is very demanding in terms of time.

There are a number of ways in which the predetermined information and associated identifier values can be stored within the lookup storage. For example, the lookup storage may be hardwired in order to identify predetermined information and associated identifiers for data blocks that are expected to arise frequently within the images being processed. However, in one embodiment the contents of the lookup storage are not hardwired, and instead the image processing apparatus further comprises update circuitry that is configured to update the predetermined information stored in the lookup storage on occurrence of a predetermined event. Considering situations where the commonly used data blocks are known, then the predetermined event can be arranged to be the start of the processing of the data blocks of a new frame, or the predetermined event could be the beginning of execution of a program on the image processing apparatus to perform the encoding operation.

In an alternative embodiment, the predetermined event comprises a match not being detected for the current input data block, and the update circuitry is configured in response to the predetermined event to create an entry within the lookup storage to store the predetermined information relating to the encoded data block generated for the current input data block, and the associated identifier value. Hence, in such an embodiment, whenever a match is not detected, this causes a new entry to be stored within the lookup storage relating to the current input data block that did not achieve a match within the lookup storage. This can be useful in a variety of situations, for example where the input data blocks are more likely to be identical when positioned near each other within an image frame, and where the data blocks forming an image frame are encoded one after the other, moving sequentially through the data blocks of the image frame.

As a further variant, the predetermined event comprises a match not being detected a predetermined multiple number of times for a particular identifier value. Hence an entry will only be allocated for that identifier value once that identifier value has been generated more than once, and resulted in a miss within the lookup circuitry a plurality of times, for example two or more times. Hence, a separate record may be kept of identifier values which have resulted in a miss, and if a particular identifier value is observed to result in a miss multiple times, then an entry can be allocated in the lookup storage for the associated data block. This can be used to increase the likelihood that the content allocated into the lookup storage is likely to be seen again, and accordingly future hit conditions will be detected.

The image processing apparatus can take a variety of forms, but in one embodiment forms at least part of a graphics processing unit.

Further, the encoding operation performed by the encoder circuitry can take a variety of forms. In one particular embodiment, the encoding operation conforms to the ARM Frame Buffer Compression (AFBC) protocol. In accordance with the AFBC protocol, the result of the encoding operation of an input data block produces both a header portion, and compressed payload data forming the encoded data block. The headers are stored at predictable locations within a header area of memory, and include pointers to the compressed payload data. Accordingly, the AFBC protocol can readily be configured to accommodate the above described techniques, and hence allow multiple header portions to be generated that each point to the same payload data stored in memory, in situations where the identifier value has been used to identify that the corresponding input data blocks are identical.

Viewed from a second aspect, the present invention provides a method of storing encoded data blocks, comprising: performing an encoding operation on input data blocks in order to generate encoded data blocks, an image being formed by a plurality of said input data blocks, and each of said input data blocks comprising a plurality of data values; performing a write operation in order to store the encoded data blocks to a memory; for each input data block, generating an identifier value that is dependent on the plurality of data values of the input data block; storing within a lookup storage predetermined information relating to at least one encoded data block, said predetermined information being stored within the lookup storage in association with the identifier value for the corresponding input data block; for a current input data block, determining whether a match exists between the identifier value generated for said current input data block and an identifier value stored in the lookup storage; and in the presence of said match, using the predetermined information stored in the lookup storage in association with the matching identifier value, when performing the write operation associated with the current input data block.

Viewed from a third aspect, the present invention provides a computer program product storing in a non-transitory form a computer program for controlling a computer to perform a method of storing encoded data blocks in accordance with the second aspect of the present invention. Hence, the techniques of the present invention can be used in an image processing apparatus irrespective of whether a hardware encoding mechanism or a software encoding mechanism is used.

Viewed from a fourth aspect, the present invention provides an image processing apparatus, comprising: encoder means for performing an encoding operation on input data blocks in order to generate encoded data blocks, an image being formed by a plurality of said input data blocks, and each of said input data blocks comprising a plurality of data values; write means for performing a write operation in order to store the encoded data blocks to a memory for subsequent access by decoding means; identifier generation means, for each input data block, for generating an identifier value that is dependent on the plurality of data values of the input data block; lookup storage means for storing predetermined information relating to at least one encoded data block, said predetermined information being stored within the lookup storage means in association with the identifier value for the corresponding input data block; and lookup means, for a current input data block, for determining whether a match exists between the identifier value generated for said current input data block and an identifier value stored in the lookup storage means; the write means, in the presence of said match, for using the predetermined information stored in the lookup storage means in association with the matching identifier value, when performing the write operation associated with the current input data block.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
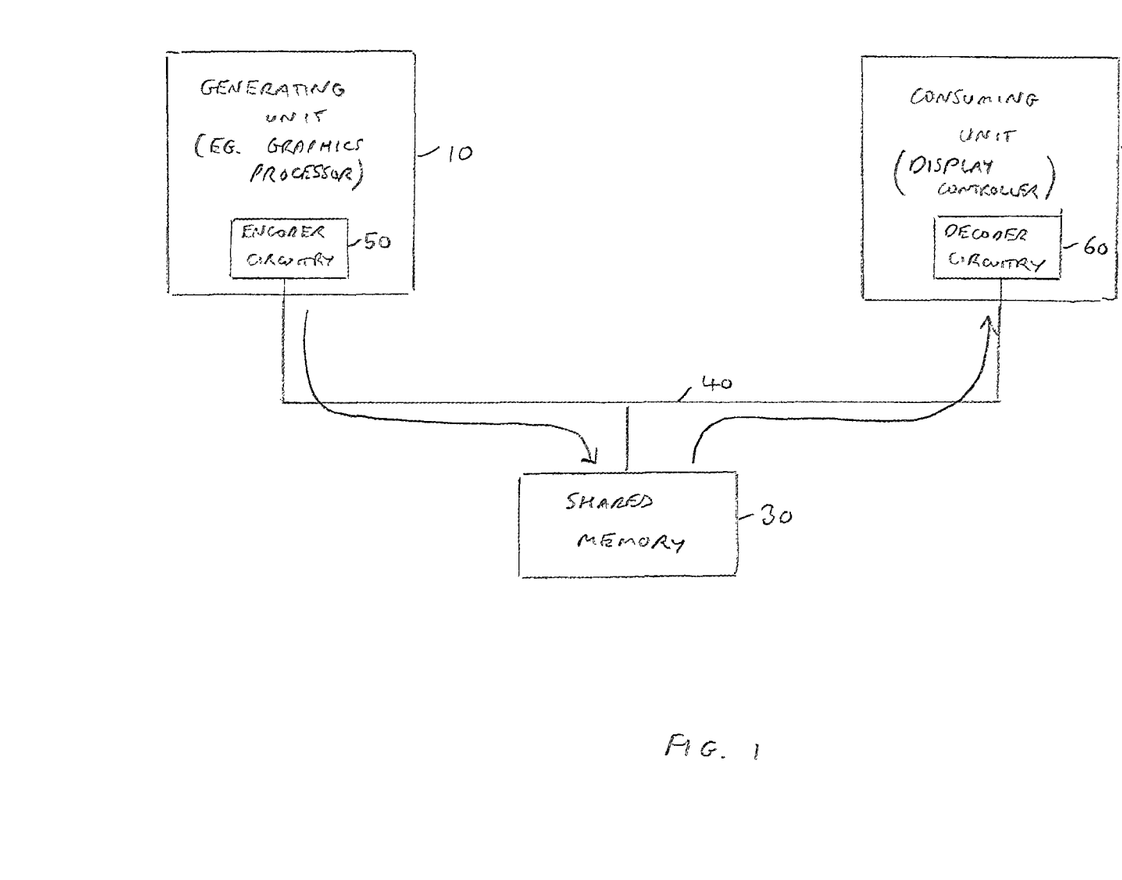
FIG. 1 is a block diagram of an image processing system including an image processing apparatus in accordance with one embodiment.

FIG. 1 is a block diagram schematically illustrating an image processing system in accordance with one embodiment. The image processing system includes an image processing apparatus referred to in FIG. 1 as a generating unit 10. The generating unit generates encoded data blocks via encoder circuitry 50 within the generating unit 10. In the illustrated embodiment, the encoded data blocks are then stored into shared memory 30 coupled to the generating unit 10 via a communication infrastructure 40, which may take the form, for example, of one or more buses. Also connected to the communication infrastructure 40 is a consuming unit 20 which is configured to read encoded data blocks from the shared memory 30 which are then decoded by the decoder circuitry 60 within the consuming unit 20 prior to further processing being performed on the decoded data. The generating unit 10 and the consuming unit 20 can take a variety of forms. However, in one embodiment the generating unit is a graphics processing unit (GPU), which performs graphics processing operations in order to generate a series of input data blocks used to constitute each image frame. To reduce the amount of information that needs to be stored within the image processing system, encoder circuitry 50 is then used to encode the various input data blocks in order to generate encoded data blocks for storing in the shared memory 30, those encoded data blocks subsequently being retrieved by the consuming unit. In one embodiment, the consuming unit may take the form of a display controller used to generate the image frames for display. Within the consuming unit, the decoder circuitry 60 will decode each of the encoded data blocks retrieved from shared memory, prior to producing the output data for display.

Figure 2:
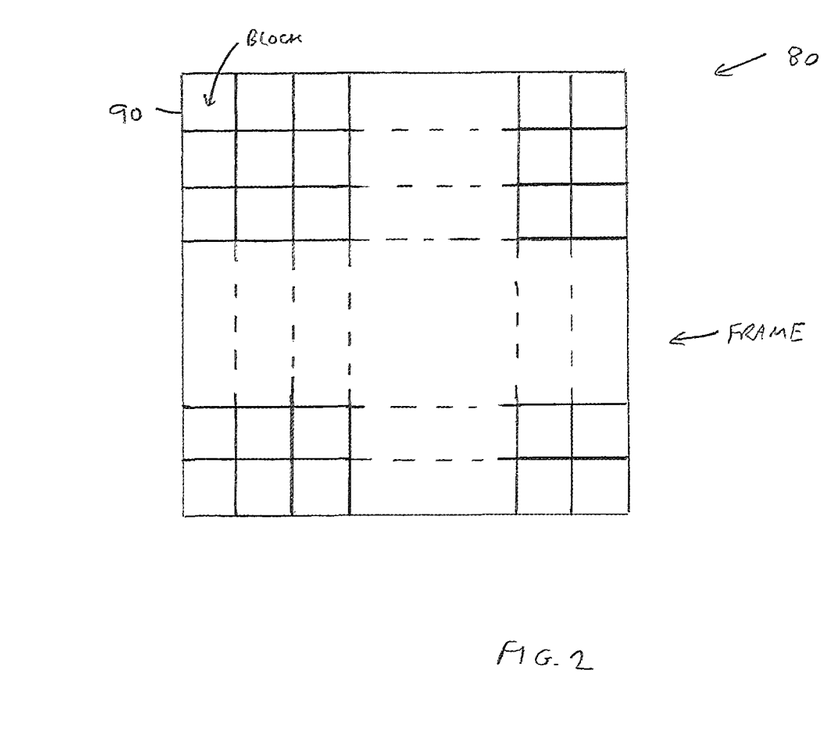
FIG. 2 schematically illustrates how each frame of image data is sectioned into a plurality of data blocks.

FIG. 2 schematically illustrates a frame 80 of image data. The frame is constituted by an array of data blocks 90, each of the data blocks comprising a plurality of data values.

Figure 3A:
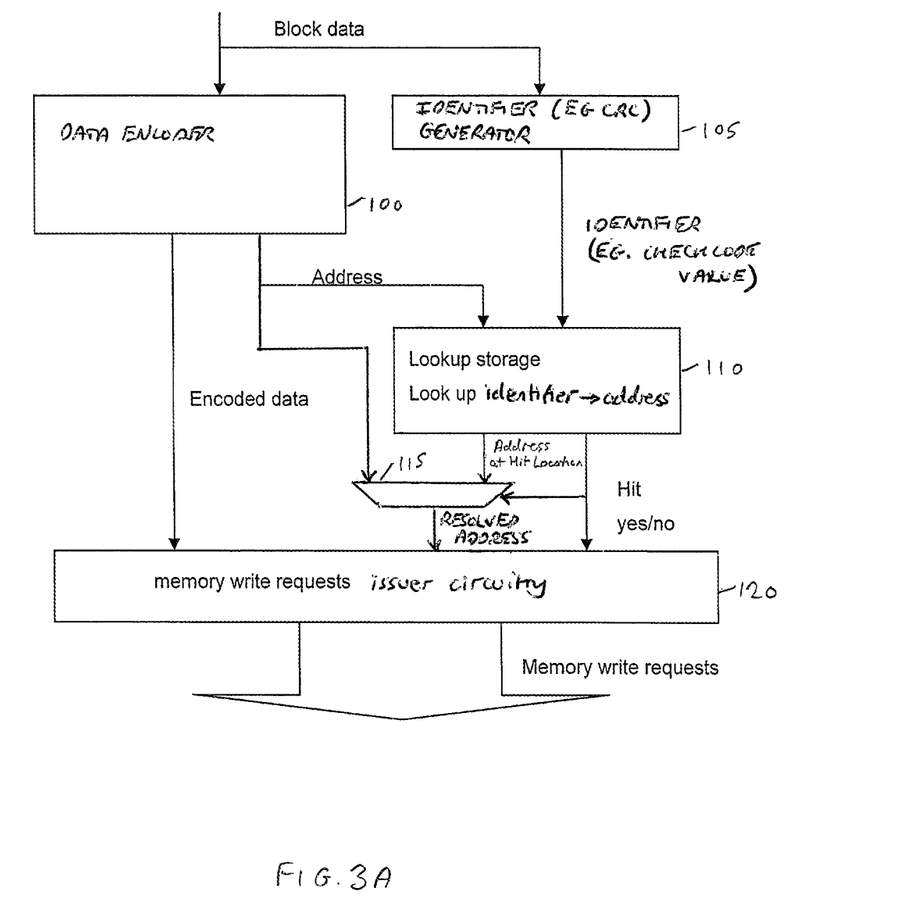
FIG. 3A illustrates components provided within the generating unit of FIG. 1 in accordance with one embodiment.

In accordance with the embodiments to be described hereafter, the generating unit 10 includes a number of other components in addition to the encoder circuitry 50 illustrated in FIG. 1, which are used during the process of generating and writing to memory encoded data blocks corresponding to a series of input data blocks. FIG. 3A illustrates the various components used in accordance with one embodiment. The encoder circuitry takes the form of the data encoder 100 shown in FIG. 3A, which is arranged to receive each input data block, and to generate therefrom both a corresponding encoded data block, and address information used to identify a location in memory 30 that the encoded data block should be stored at. The address can take a variety of forms, but in one embodiment takes the form of a pointer value used to identify the memory location.

As shown in FIG. 3A, an identifier generator circuit 105 is provided for receiving each input data block passed to the data encoder, and for each input data block is configured to generate an identifier (also referred to as a signature) that is dependent on the data values forming that input data block. The identifier is intended to provide an effectively unique identifier for the data block, such that if a subsequent data block consists of exactly the same data values (i.e. its content is identical), the identifier generator will produce the same identifier, but otherwise will produce an identifier having a different value. In practice, it is desired that the identifier occupies less bit space than the original input data block, and accordingly the identifier will not be unique for every theoretical combination of possible data values constituting an input data block. Nevertheless, the identifier generator 105 can be configured to generate an identifier value which is unique for each expected variant of the plurality of data values constituting the input data blocks.

There are a number of techniques that can be used for generating identifiers based on the input data blocks. However, in one embodiment the identifier generator 105 takes the form of a cyclic redundancy check (CRC) generator used to generate a check code value based on the data values constituting an input data block. The check code value in essence provides a signature indicative of the content of the data block.

As also shown in FIG. 3A, a lookup storage structure 110 is provided which has a plurality of entries, each entry being able to store an identifier value and a corresponding address indication used to identify the address of the encoded data block generated from the input data block having that identifier. The lookup storage may have its contents effectively hardwired, to identify identifier values and corresponding address indications for particular data block content that is expected to be seen multiple times within the image frames being processed. Hence, for example a data block consisting of all white pixels or a data block consisting of all black pixels can be encoded, with the corresponding encoded data being stored in memory at a particular address location, the corresponding identifiers for those data blocks can be generated, and the lookup storage can be arranged to store both the identifier and the address for the corresponding encoded data block in memory.

As an alternative to effectively hardwiring the lookup storage, the contents of the lookup storage can be updated in use, in such an embodiment the lookup storage 110 also including update circuitry used to populate each entry of the lookup storage. In such embodiments, the lookup storage can be populated at predetermined points in time, for example prior to processing each image frame, or when the image processing apparatus is first activated to perform some encoding. Alternatively other predetermined events can be used to cause the update circuitry to alter the contents of the lookup storage, as will be discussed in more detail below following a discussion of how the lookup storage is used.

Considering how the lookup storage is used, each time a new input data block is processed, and accordingly an identifier is generated by the identifier generator 105, that identifier is forwarded to lookup circuitry within the lookup storage 110, which compares the received identifier against the identifiers stored in each of the entries of the lookup storage. In the event of a match being detected, also referred to herein as a hit condition, the address stored within the entry giving rise to the hit condition is output to the multiplexer 115, the multiplexer also receiving the address output by the data encoder 100. The multiplexer receives as a control signal a hit signal output by the lookup storage, which is set when a hit condition is detected, and which is cleared when the lookup operation does not identify any matching entries (also referred to herein as a miss condition). In one embodiment, the hit signal is set to a logic one value, and is cleared to a logic zero value, but it will be appreciated that the format of the hit signal can be altered dependent on embodiment.

The multiplexer 115 outputs as a resolved address either the address received from the lookup storage in the event that the hit signal is set, or the address received from the data encoder 100 in the event that the hit signal is not set.

The memory write requests issuer circuitry 120 (also referred to herein as write circuitry) receives both the resolved address and the encoded data generated by the data encoder 100. It also receives the hit signal output by the lookup storage 110. In the event that the hit signal is not set (i.e. no matching entry has been found in the lookup storage 110), then the write circuitry 120 operates in its usual manner to store to memory both the encoded data block received from the data encoder 100 and associated control data which includes the resolved address output by the multiplexer 115, this address being used to identify the location within the memory where the encoded data block is stored. The control data can take a variety of forms, but in one embodiment takes the form of a header associated with the encoded data, that header including a pointer to the location within memory where the encoded data block is stored, that pointer being determined by the resolved address output from the multiplexer 115.

In the event of a hit condition being detected within the lookup storage, the write circuitry 120 is configured not to adopt its usual operation, but instead only to store out to memory the control data, including the resolved address. The encoded data block received by the data encoder 100 is discarded, since in this instance the resolved address will point to a location in memory where the required encoded data block has already been stored as a result of previous data encoding activity. By this approach, it will be appreciated that where there are a number of data blocks that have identical data, corresponding control data will be stored in the memory, but that control data can all be arranged to point to the same physical location in memory, with the encoded data block being stored only once, at that memory location. This hence significantly reduces the memory requirements, and can also reduce the bandwidth constraints that may otherwise be placed on the communication infrastructure 40.

As mentioned earlier, various predetermined events can cause the contents of the lookup storage to be updated. In one embodiment, if the earlier described lookup operation results in a miss condition, the update circuitry is arranged to allocate an entry within the lookup storage for the current data block. In particular, the identifier provided by the identifier generator 105 is stored in that allocated entry in association with the address output by the data encoder 100.

The lookup storage can be configured in a variety of ways, but will typically have a relatively small number of entries. Accordingly, when such an allocation process is performed, it is likely that pre-existing content will need to be overwritten. In one embodiment, the lookup storage is configured in a similar way to a fully associative cache, such that when an entry is to be allocated for a new identifier and associated address, any of the existing entries can be selected as a victim entry in which to overwrite the current contents with that new identifier and associated address, and similarly when a lookup is being performed, all of the entries are reviewed for a matching identifier. Any of a number of known techniques can be used to decide which victim entry to select when allocating a new identifier and address to the lookup storage, for example a least recently used scheme, a round robin scheme, etc.

Figure 3B:
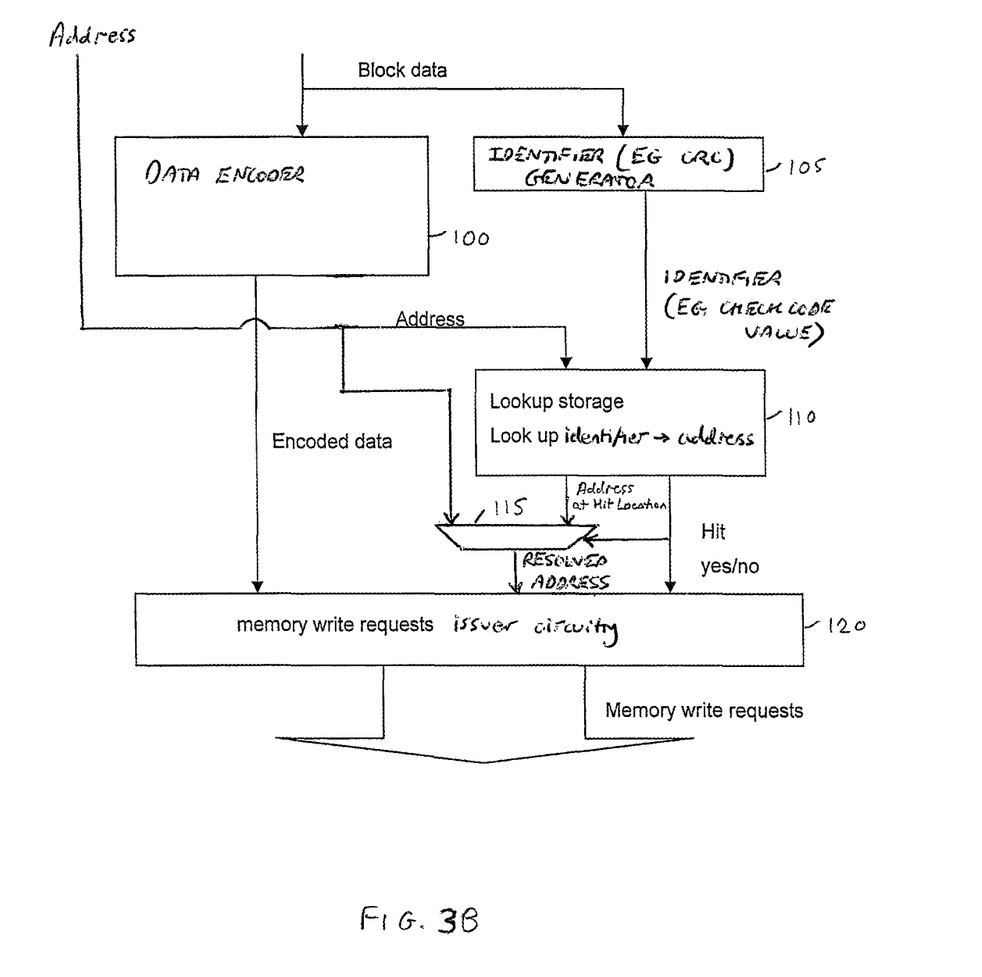
FIG. 3B illustrates components provided within the generating unit of FIG. 1 in accordance with an alternative embodiment.

In the example of FIG. 3A, the address is generated by the data encoder 100. However, FIG. 3B illustrates an alternative embodiment where the address is provided from elsewhere in the system, in association with the input data block, and the data encoder merely generates the encoded data block used to represent the input data block. As can be seen from a comparison of FIGS. 3A and 3B, the apparatus works in exactly the same way, other than the address being provided from a different source.

In FIGS. 3A and 3B it is assumed that the data encoder 100 performs the data encoding operation in parallel with the generation of the identifier by the identifier generator 105. Whilst this provides the best performance, if power consumption is more of a concern than overall performance, the operation of the data encoder 100 can be delayed until the identifier has been generated, and the lookup has been performed in the lookup storage 110. The data encoder can then be activated based on the hit signal output by the lookup storage, so that data blocks are only encoded if a hit is not detected in the lookup storage. This hence avoids encoded data blocks being generated unnecessarily, since in the event of a hit condition the encoded data is not written out to the memory and hence there is no need to generate that encoded data.

Figure 4:
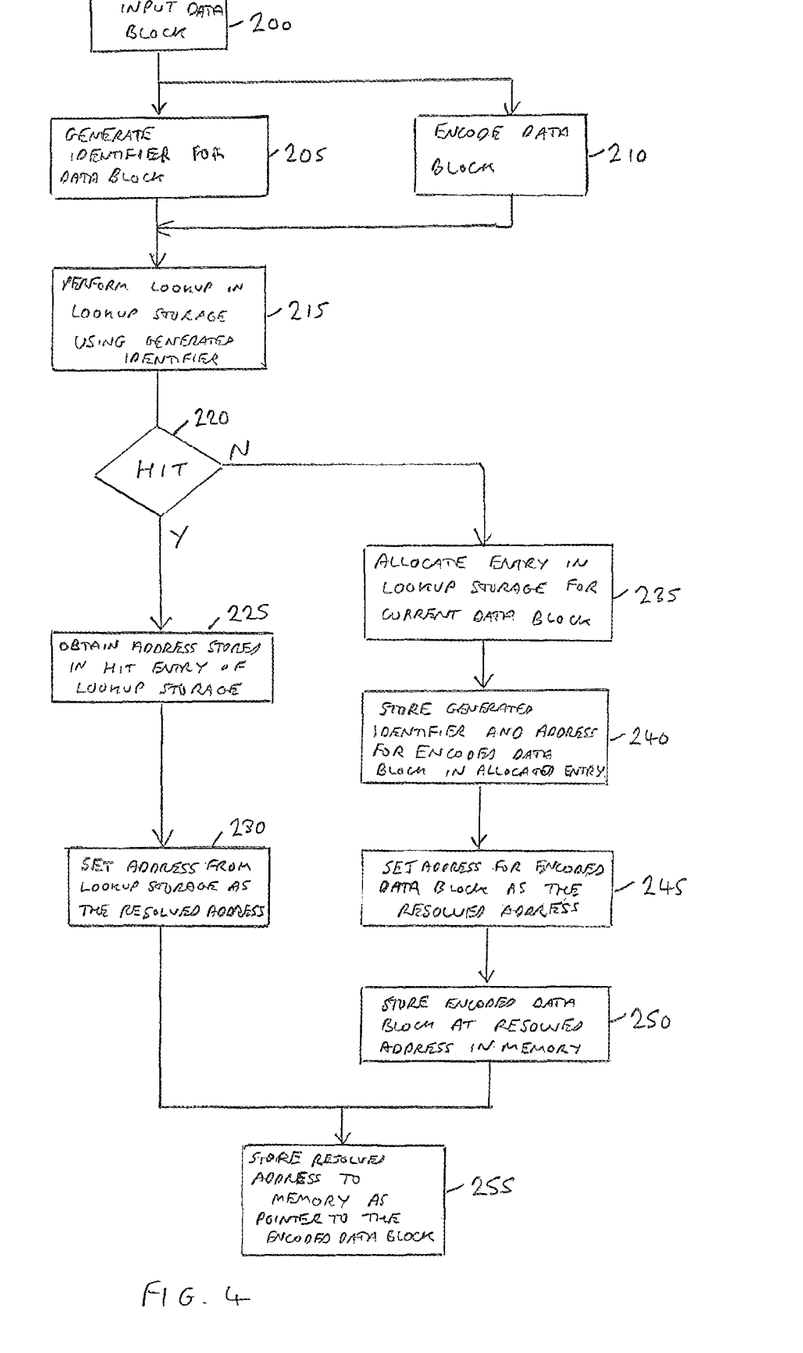
FIG. 4 is a flow diagram illustrating the operation of the circuitry of FIG. 3A or 3B in accordance with one embodiment.

FIG. 4 is a flow diagram illustrating the operation of the circuitry of FIGS. 3A and 3B in accordance with one embodiment. At step 200, an input data block is received, whereafter steps 205 and 210 are performed in parallel. In particular, an identifier is generated for the data block at step 205, and the data block is encoded at step 210.

Thereafter, at step 215, a lookup is performed in the lookup storage 110 using the generated identifier, whereafter it is determined at step 220 whether a hit has been detected. If so, then the address stored in the hit entry of the lookup storage is output at step 225, whereafter at step 230 that address is set by the multiplexer 115 as the resolved address. Following step 230, the resolved address is stored to memory as a pointer to the encoded data block. However, in this instance the encoded data block is not saved at the same time, since the pointer will point to a previously stored encoded data block that is a correct encoding of the input data block, and which has been stored previously to the memory when processing an earlier input data block with the same content.

If a hit is not detected at step 220, then at step 235 an entry in the lookup storage 110 is allocated for the current input data block. Thereafter, the generated identifier and the address for the encoded data block are stored in that allocated entry at step 240. In addition, the address for the encoded data block is set as the resolved address at step 245, i.e. the address output from the data encoder 100 in the embodiment of FIG. 3A, or the address received in association with the input data block in accordance with the embodiment of FIG. 3B.

At step 250, the encoded data block as generated by the data encoder 100 is then stored at the resolved address in memory, and in addition at step 255 the resolved address is stored to memory as a pointer to the encoded data block (as mentioned earlier, typically the resolved address forms part of some control data stored to memory associated with the received input data block).

Whilst in the above described embodiment, it is assumed that an entry in the lookup storage is allocated each time a hit is not detected at step 220, in an alternative embodiment a more advanced policy could be used where an entry is not allocated immediately a miss is detected for a particular identifier, but instead a separate record is kept of identifiers which have resulted in a miss, and if a particular identifier is observed to result in a miss multiple times, then an entry can be allocated in the lookup storage for the associated data block. This can be used to increase the likelihood that the content allocated into the lookup storage will be seen again, and accordingly future hit conditions will be detected.

Whilst in FIG. 4 the data block is shown as being encoded at step 210 in parallel with the generation of the identifier at step 205, as mentioned earlier the operation of the encoder could instead be deferred until after the lookup has been performed, such that only if a miss condition is detected will the encoder then be activated to perform the encoding operation. This will enable a decrease in the energy consumption by avoiding encoding data that will not be used.

Figure 5:
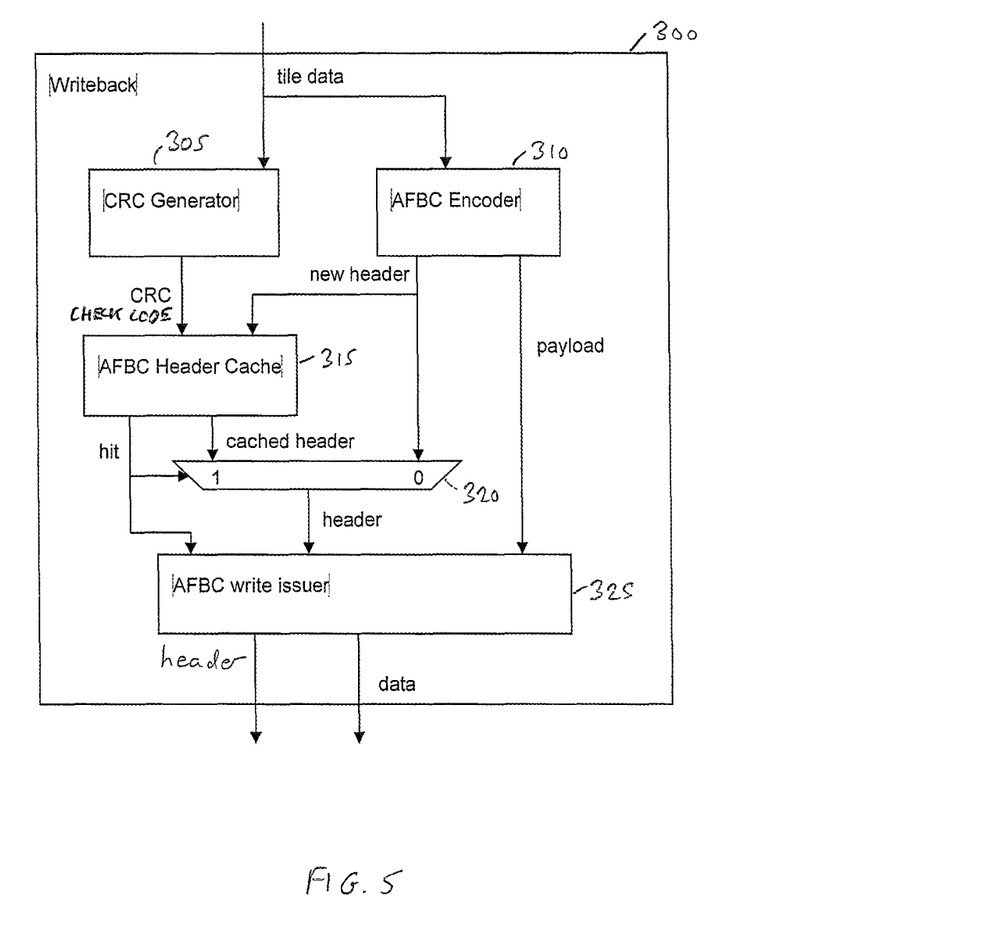
FIG. 5 illustrates a specific example of a writeback circuitry that may be included within the generating unit of FIG. 1 in accordance with one embodiment.

The type of encoding performed by the data encoder 100 will vary dependent on embodiment. FIG. 5 illustrates a particular example of the circuitry of FIG. 3 for an embodiment where the encoder is arranged to perform ARM frame buffer compression (AFBC), the AFBC protocol being a lossless image compression protocol and format that seeks to minimise the amount of data transferred between blocks within the system, for example between a chip and external memory. In accordance with the AFBC compression scheme, the encoding operation of each input data block generates two parts, namely a header and a compressed payload data. The compressed payload data forms the encoded data referred to in the earlier figures, and the header forms the earlier mentioned control data, and includes a pointer to a location in memory where the compressed payload data is to be stored.

To allow for random lookup (which is useful when having AFBC encoded textures), the headers are stored at a predictable location in memory based on x and y coordinate data of the data block being considered. Hence, by way of example, for blocks which each consist of an array of 16×16 pixels, pixel position (0,0) will be in block (0,0), whilst pixel position (16,16) will be in block (1,1). In particular, in one embodiment the predictable location is determined by the equation:

$$\text{start\_addr} + (\text{block}\_y * (\text{width}/\text{block\_width}) + \text{block}\_x) * \text{HEADER\_SIZE}$$

where in the above example the block width is 16.

Figure 6A:
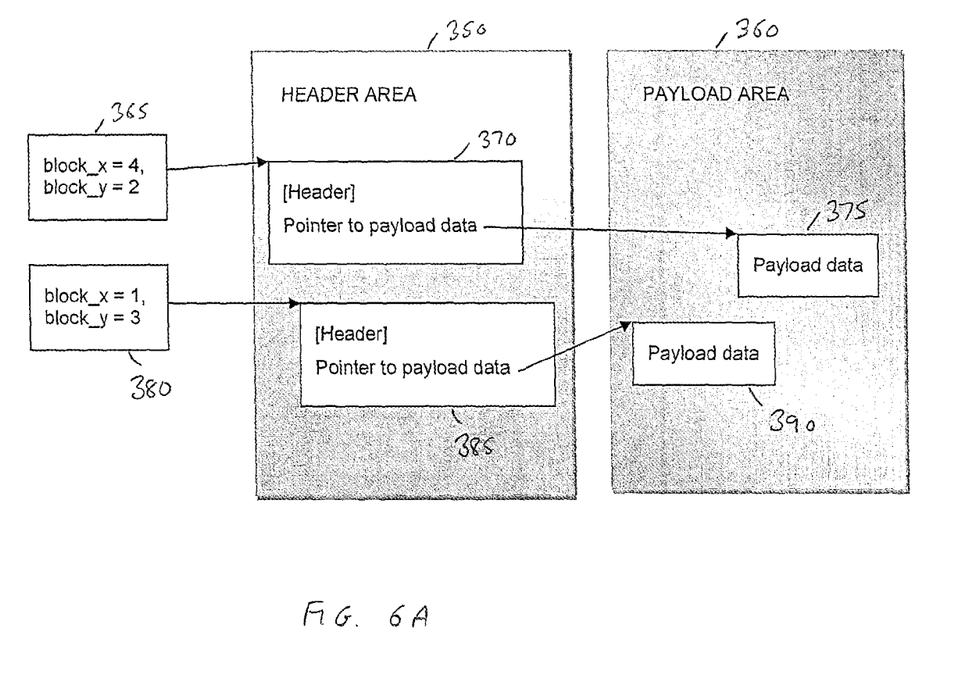
FIGS. 6A and 6B illustrate the storage of encoded data blocks and associated headers to memory in a situation where the described embodiment is not used (FIG. 6A), and in a situation where the described embodiment is used (FIG. 6B)

Hence, as shown schematically in FIG. 6A, particular x and y coordinates for each block will determine the location at which the header portion is stored. Hence, for the block 365, the header portion 370 will be stored at a particular location within the header area 350 of the shared memory, whilst for another block 380, the corresponding header portion 385 will be stored at a different location within the header area 350. In accordance with the AFBC protocol, each header then contains, amongst other data, a pointer to the location within a payload area 360 of the memory where the corresponding payload data is stored. Hence, the header 370 includes a pointer to the payload data 375, and the header 385 includes a pointer to the payload data 390.

Figure 6B:
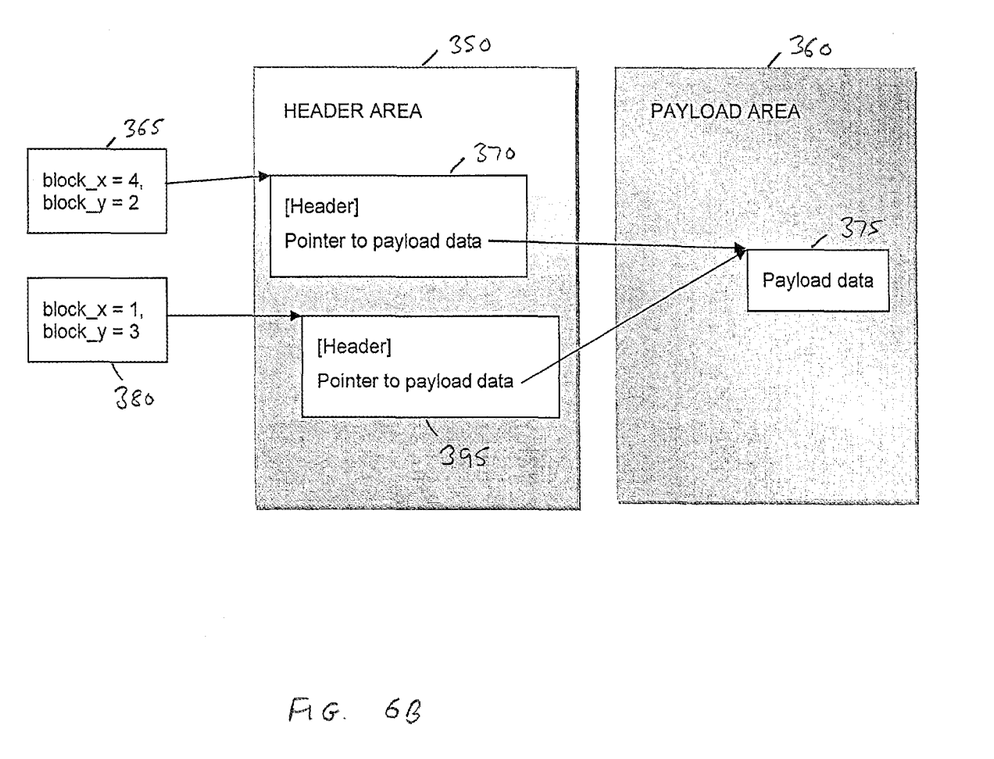

However, by adopting the earlier described technique, as shown in FIG. 6B the amount of payload data stored can be significantly reduced. In particular, if when processing the input data block 380, the identifier generated for that data block hits in the lookup storage, due to the content of the data block 380 matching the content of the data block 365, the address information obtained from the lookup storage can be used to produce a header 395 that points to the already stored payload data 375, hence avoiding the need to store the same payload data twice.

When comparing the circuitry of FIG. 5 with the earlier described circuitry of FIG. 3A, it will be seen that the data encoder 100 of FIG. 3A takes the form of the AFBC encoder 310, the identifier generator 105 takes the form of the CRC generator 305, and the lookup storage 110 takes the form of AFBC header cache 315. The entire header produced by the AFBC encoder 310 is passed to the header cache to enable that header to be stored into the header cache in the event of a miss condition arising on a lookup, and in this embodiment each entry within the header cache then stores an identifier and a corresponding header (which includes amongst other things an address indication in the form of a pointer). The multiplexer 115 then takes the form of the multiplexer 320 in FIG. 5, with the multiplexer receiving both the header generated by the AFBC encoder 310 and any cached header within the AFBC header cache 315 associated with a hit entry. The multiplexer 320 then outputs a resolved header to the write issuer circuitry 325 (corresponding to the write circuitry 120 of FIG. 3A). In the absence of a hit, the circuitry 325 stores the payload data (i.e. the encoded data) to memory at the location identified by the pointer in the header, and also stores the header portion to memory at a predetermined location as discussed earlier. However, in the presence of a hit, the payload data received by the encoder 310 is ignored, and instead only the header is stored out by the write circuitry 325 to memory. The entire circuitry shown in FIG. 5 may collectively be referred to as the write back circuitry 300 of the graphics processor.

Figure 7:
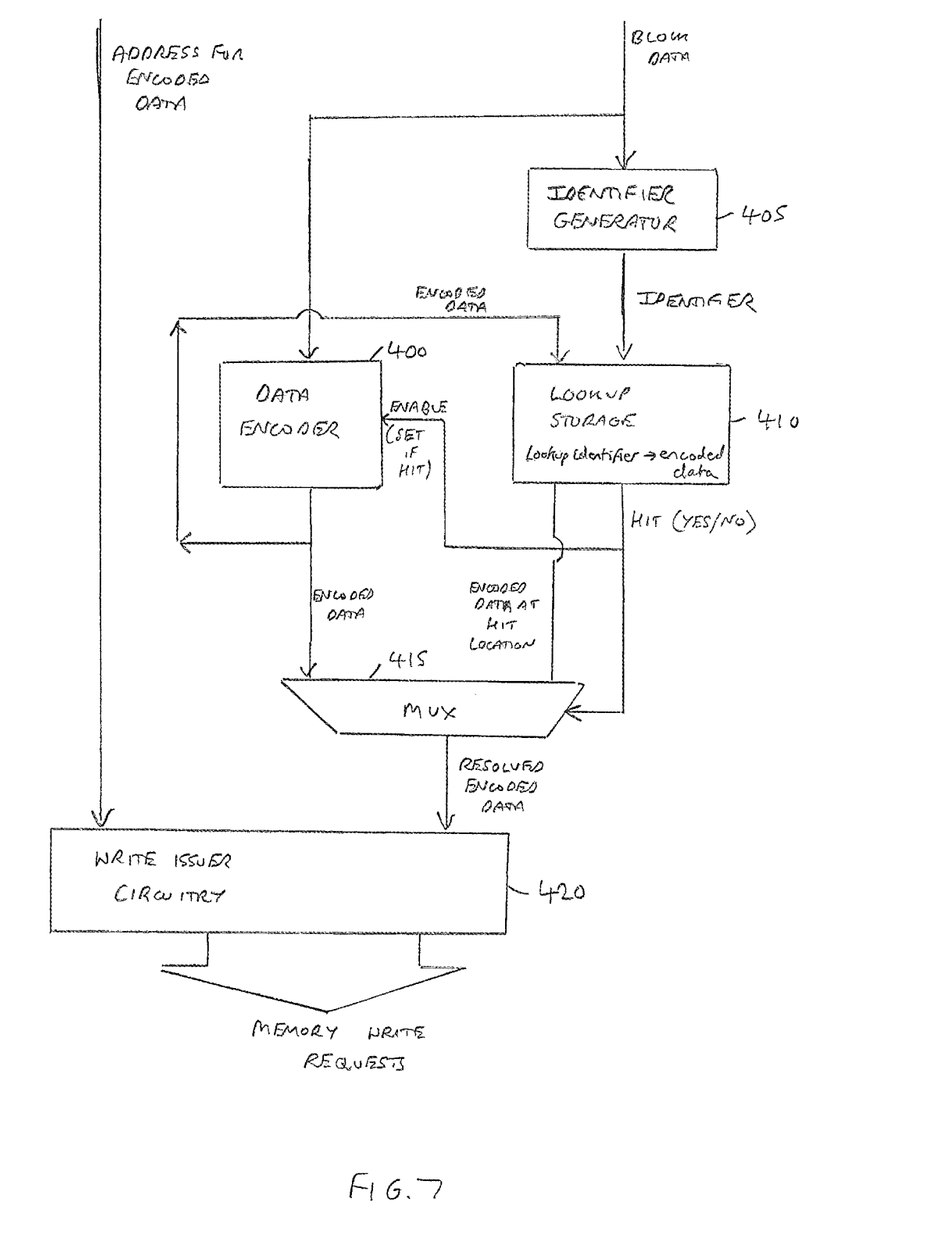
FIG. 7 is a block diagram illustrating components provided within the generating unit of FIG. 1 in accordance with an alternative embodiment.

FIG. 7 illustrates an alternative embodiment to that discussed earlier with reference to FIGS. 3A and 3B. In this embodiment, the data encoder 400 corresponds to the data encoder 100, the identifier generator 405 corresponds to the identifier generator 105, and the lookup storage 410 corresponds to the lookup storage 110. However, in this embodiment the lookup storage is configured to store in each entry both the identifier and the associated encoded data generated by the data encoder 400. Further, the operation of the data encoder 400 is controlled by an enable signal derived from the hit signal output by the lookup storage.

The multiplexer 415 receives both the encoded data from the data encoder and any encoded data from a hit location within the lookup storage 410, and is controlled by the hit signal generated by the lookup storage. The address at which the encoded data needs to be written in memory is then provided directly to the write issuer circuitry 420 from elsewhere in the system. As a result, the write issuer circuitry can then store to the specified address in memory the resolved encoded data output by the multiplexer 415. Such a structure is useful in situations where the encoding operation is very demanding in terms of power consumption and/or time, potentially enabling a significant reduction in the power consumption and latency when the data blocks to be encoded include a number of identical blocks.

Figure 8:
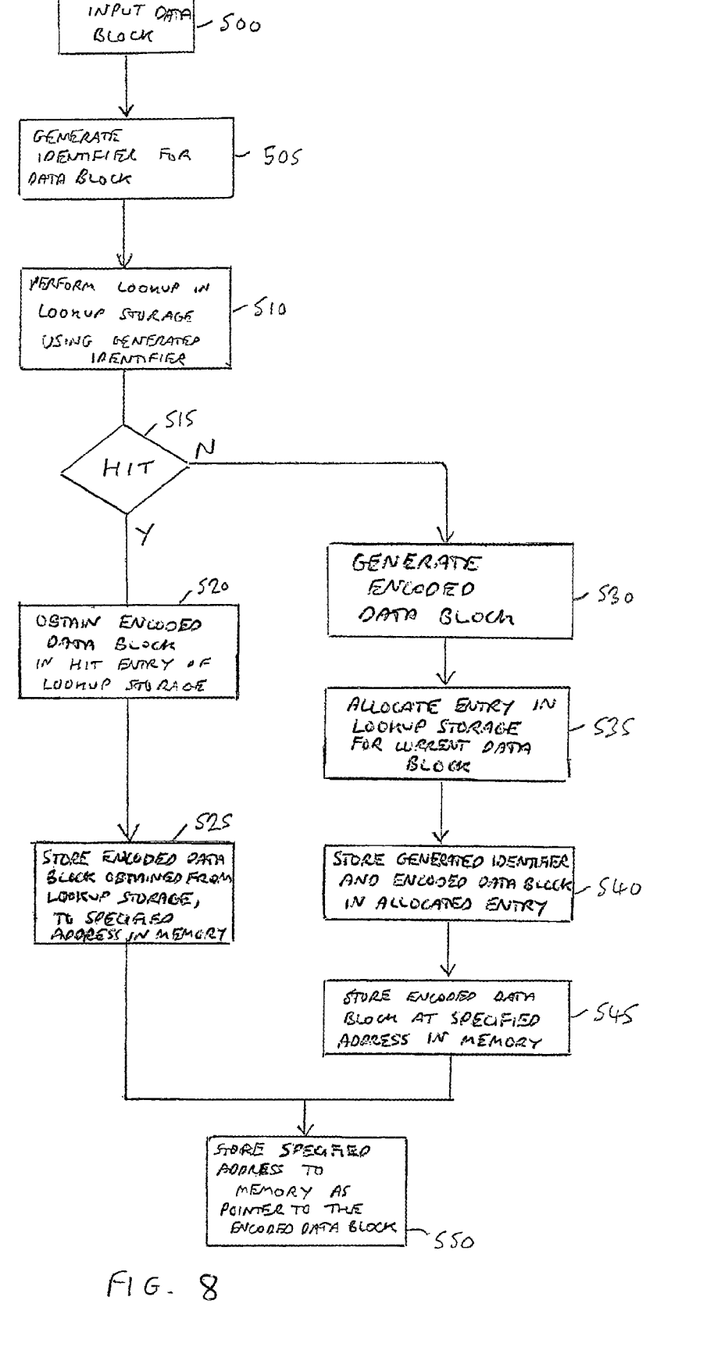
FIG. 8 is a flow diagram illustrating the operation of the circuitry of FIG. 7 in accordance with one embodiment.

FIG. 8 is a flow diagram illustrating the operation of the circuitry of FIG. 7. At step 500, an input data block is received, whereafter at step 505 an identifier is generated for that data block. At step 510, a lookup operation is performed in the lookup storage 410 using the generated identifier, whereafter at step 515 it is determined whether a hit condition is detected. If so, then the encoded data block from the hit entry is output to the multiplexer 415 at step 520, whereafter at step 525 the encoded data block obtained from the lookup storage is then stored to the specified address in memory. Depending on the type of encoding being performed, then optionally at step 550 the specified address may also be stored to memory as a pointer to the encoded data block, for example as part of associated control data.

If a hit is not detected at step 515, then the encoder 400 is activated to generate an encoded data block at step 530. In addition, in one embodiment an entry is then allocated into the lookup storage 410 for the current data block being processed (at step 535). At step 540, the generated identifier and the generated encoded data block are then stored in that allocated entry. At step 545, the encoded data block produced by the data encoder 400 is then stored at the specified address in memory. Again step 550 may optionally be performed if required.

Figure 9:
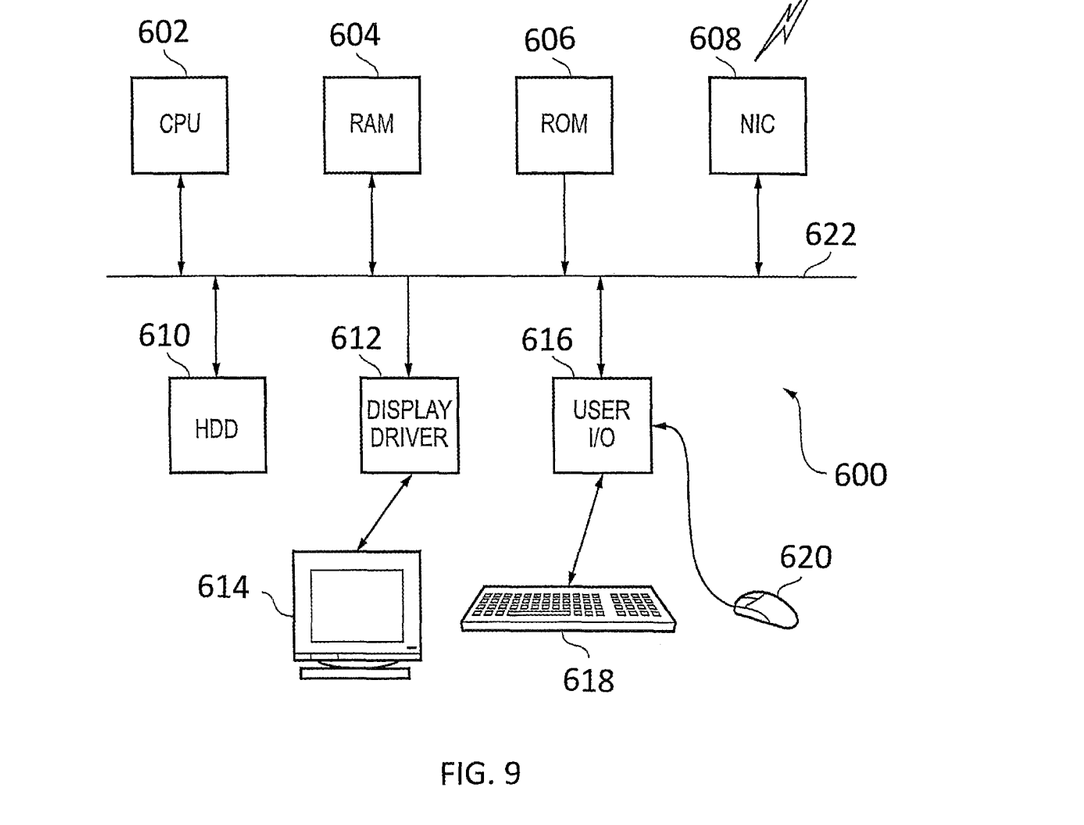
FIG. 9 illustrates a general purpose computer of a type that may be used to implement the techniques of the described embodiments for storing encoded data blocks.

FIG. 9 schematically illustrates a general purpose computer 600 of the type that may be used to implement the above described method for storing encoded data blocks. The general purpose computer 600 includes a central processing unit 602, a random access memory 604, a read only memory 606, a network interface card 608, a hard disk drive 610, a display driver 612 and monitor 614 and a user input/output circuit 616 with a keyboard 618 and mouse 620 all connected via a common bus 622. In operation the central processing unit 602 will execute computer program instructions that may be stored in one or more of the random access memory 604, the read only memory 606 and the hard disk drive 610 or dynamically downloaded via the network interface card 608. The results of the processing performed may be displayed to a user via the display driver 612 and the monitor 614. User inputs for controlling the operation of the general purpose computer 600 may be received via the user input output circuit 616 from the keyboard 618 or the mouse 620. It will be appreciated that the computer program could be written in a variety of different computer languages. The computer program may be stored and distributed on a recording medium or dynamically downloaded to the general purpose computer 600. When operating under control of an appropriate computer program, the general purpose computer 600 can perform the above described method for storing encoded data blocks and can be considered to form an apparatus for performing the above described method for storing encoded data blocks. The architecture of the general purpose computer 600 could vary considerably and FIG. 9 is only one example.

It will be appreciated from the above described embodiments that those embodiments allow a significant reduction in the memory consumption and bandwidth requirements of an image processing system. Alternatively, or in addition, the same basic mechanism can be used to reduce power consumption and/or improve latency in systems where the data encoding operation is intensive in terms of power consumption and/or latency.

The described techniques provide a mechanism for detecting identical blocks in an image, along with a way to exploit indirection in some block based image formats in order to reduce the memory footprint and potentially improve memory access patterns. In many practical implementations, the circuitry required to perform the identifier generator function may already exist for other purposes, for example it may be the case that a CRC generator will already be provided, and accordingly that circuitry can be re-used for the purpose described in the above embodiments.

The described techniques can be used in a variety of situations, including situations where the encoding operation is performed by hardware, and situations where the encoding operation is performed by software.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. An image processing apparatus, comprising:
  encoder circuitry configured to perform an encoding operation on input data blocks in order to generate encoded data blocks, an image being formed by a plurality of said input data blocks, and each of said input data blocks comprising a plurality of data values;
  write circuitry configured to perform a write operation in order to store the encoded data blocks to a memory for subsequent access by decoding circuitry;
  identifier generation circuitry configured, for each input data block, to generate an identifier value that is dependent on the plurality of data values of the input data block;
  a lookup storage configured to store predetermined information relating to at least one encoded data block, said predetermined information being stored within the lookup storage in association with the identifier value for the corresponding input data block; and
  lookup circuitry configured, for a current input data block, to determine whether a match exists between the identifier value generated for said current input data block and an identifier value stored in the lookup storage;
  the write circuitry being configured, in the presence of said match, to use the predetermined information stored in the lookup storage in association with the matching identifier value, when performing the write operation associated with the current input data block.

2. An image processing apparatus as claimed in claim 1, wherein the lookup storage is configured to store predetermined information relating to at least one encoded data block previously stored to said memory by the write circuitry.

3. An image processing apparatus as claimed in claim 1, wherein said identifier generation circuitry is configured, for each input data block, to receive one of said input data block and the corresponding encoded data block generated by the encoder circuitry, and to generate therefrom the identifier value.

4. An image processing apparatus as claimed in claim 1, wherein:
  said predetermined information comprises at least an address indication used to identify a location within said memory for storage of the corresponding encoded data block.

5. An image processing apparatus as claimed in claim 4, wherein:
  the write circuitry is configured for the current input data block, in the absence of said match, to store to said memory both the corresponding encoded data block and control data identifying the location within said memory where the encoded data block is stored; and
  the write circuitry is configured for the current input data block, in the presence of said match, to store to said memory said control data, the control data using the address indication obtained from the lookup storage to identify the location within said memory where the required encoded data block has been stored via a previous write operation.

6. An image processing apparatus as claimed in claim 4, wherein said address indication comprises a pointer value.

7. An image processing apparatus as claimed in claim 5, wherein said control data forms a header portion for the encoded data block corresponding to the current input data block, and the operation of the write circuitry in the presence of said match results in the memory storing multiple header portions associated with a single stored encoded data block.

8. An image processing apparatus as claimed in claim 4, wherein said predetermined information comprises a header portion for the corresponding encoded data block, each header portion including said address indication.

9. An image processing apparatus as claimed in claim 1, wherein the identifier generation circuitry is configured to perform a cyclic redundancy check operation in order to generate as said identifier value a check code value.

10. An image processing apparatus as claimed in claim 5, wherein the encoder circuitry is configured, in the presence of said match, not to perform said encoding operation for the current input data block.

11. An image processing apparatus as claimed in claim 1, wherein said predetermined information comprises the corresponding encoded data block.

12. An image processing apparatus as claimed in claim 11, wherein:
  the write circuitry is configured for the current input data block, in the absence of said match, to store to said memory the corresponding encoded data block as generated by the encoder circuitry from the current input data block; and
  the write circuitry is configured for the current input data block, in the presence of said match, to store to said memory the encoded data block that is stored within the lookup storage in association with the matching identifier value.

13. An image processing apparatus as claimed in claim 12, wherein the write circuitry is further configured to store to said memory control data identifying the location within said memory where the encoded data block is stored.

14. An image processing apparatus as claimed in claim 12, wherein the encoder circuitry is configured, in the presence of said match, not to perform said encoding operation for the current input data block.

15. An image processing apparatus as claimed in claim 1, further comprising update circuitry configured to update the predetermined information stored in the lookup storage on occurrence of a predetermined event.

16. An image processing apparatus as claimed in claim 15, wherein the predetermined event comprises said match not being detected for the current input data block, and the update circuitry is configured in response to the predetermined event to create an entry within the lookup storage to store the predetermined information relating to the encoded data block generated for the current input data block, and the associated identifier value.

17. An image processing apparatus as claimed in claim 1, wherein the image processing apparatus forms at least part of a graphics processing unit.

18. An image processing apparatus as claimed in claim 1, wherein the encoding operation performed by said encoder circuitry conforms to the ARM Frame Buffer Compression (AFBC) protocol.

19. A method of storing encoded data blocks, comprising:
performing an encoding operation on input data blocks in order to generate encoded data blocks, an image being formed by a plurality of said input data blocks, and each of said input data blocks comprising a plurality of data values;
performing a write operation in order to store the encoded data blocks to a memory;
for each input data block, generating an identifier value that is dependent on the plurality of data values of the input data block;
storing within a lookup storage predetermined information relating to at least one encoded data block, said predetermined information being stored within the lookup storage in association with the identifier value for the corresponding input data block;
for a current input data block, determining whether a match exists between the identifier value generated for said current input data block and an identifier value stored in the lookup storage; and
in the presence of said match, using the predetermined information stored in the lookup storage in association with the matching identifier value, when performing the write operation associated with the current input data block.

20. A computer program product storing in a non-transitory form a computer program for controlling a computer to perform a method of storing encoded data blocks as claimed in claim 19.

21. An image processing apparatus, comprising:
encoder means for performing an encoding operation on input data blocks in order to generate encoded data blocks, an image being formed by a plurality of said input data blocks, and each of said input data blocks comprising a plurality of data values;
write means for performing a write operation in order to store the encoded data blocks to a memory for subsequent access by decoding means;
identifier generation means, for each input data block, for generating an identifier value that is dependent on the plurality of data values of the input data block;
lookup storage means for storing predetermined information relating to at least one encoded data block, said predetermined information being stored within the lookup storage means in association with the identifier value for the corresponding input data block; and
lookup means, for a current input data block, for determining whether a match exists between the identifier value generated for said current input data block and an identifier value stored in the lookup storage means;
the write means, in the presence of said match, for using the predetermined information stored in the lookup storage means in association with the matching identifier value, when performing the write operation associated with the current input data block.

\* \* \* \* \*